United States Patent
Cui et al.

(10) Patent No.: US 9,298,284 B2
(45) Date of Patent: Mar. 29, 2016

(54) SYSTEM AND METHOD FOR OPTICALLY-BASED ACTIVE STYLUS INPUT RECOGNITION

(71) Applicant: QUALCOMM Incorporated, San Diego, CA (US)

(72) Inventors: Xiquan Cui, San Jose, CA (US); Evgeni Petrovich Gousev, Saratoga, CA (US); Russell Wayne Gruhlke, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 14/204,989

(22) Filed: Mar. 11, 2014

(65) Prior Publication Data

US 2015/0261323 A1 Sep. 17, 2015

(51) Int. Cl.
*G06F 3/0354* (2013.01)
*G06F 3/042* (2006.01)

(52) U.S. Cl.
CPC ........ *G06F 3/03542* (2013.01); *G06F 3/03545* (2013.01); *G06F 3/042* (2013.01); *G06F 3/0421* (2013.01); *G06F 2203/04101* (2013.01); *G06F 2203/04109* (2013.01)

(58) Field of Classification Search
CPC ... G06F 3/0346; G06F 3/03542; G06F 3/042; G06F 3/0421; G06F 3/0428; G06F 2203/04101; G06F 2203/04109; G06F 3/03545
USPC .......................................................... 345/173
See application file for complete search history.

(56) References Cited

U.S. PATENT DOCUMENTS

| | | | |
|---|---|---|---|
| 4,150,285 A | 4/1979 | Brienza et al. | |
| 7,442,914 B2 * | 10/2008 | Eliasson ............... | G06F 3/0386 250/221 |
| 8,094,136 B2 | 1/2012 | Eliasson et al. | |
| 8,436,833 B2 | 5/2013 | King et al. | |
| 8,564,790 B2 | 10/2013 | Kiyose | |
| 2005/0162398 A1 | 7/2005 | Eliasson et al. | |
| 2008/0029316 A1 * | 2/2008 | Jaeger et al. ............... | 178/19.01 |
| 2010/0177060 A1 | 7/2010 | Han | |
| 2011/0115750 A1 * | 5/2011 | Ebner et al. ................... | 345/175 |

(Continued)

FOREIGN PATENT DOCUMENTS

GB 2299856 A 10/1996

OTHER PUBLICATIONS

International Search Report and Written Opinion—PCT/US2015/018253—ISA/EPO—May 15, 2015.

*Primary Examiner* — Tom Sheng
(74) *Attorney, Agent, or Firm* — Kilpatrick Townsend Stockton LLP

(57) ABSTRACT

Methods, systems, computer-readable media, and apparatuses for determining a location fix for optically-based active stylus input recognition technology are presented. The method includes, from an active light source capable of being handled by a user, emitting an electromagnetic wave signal in an initial direction toward a planar layer. The method also includes directing the electromagnetic wave signal in one or more lateral directions different from the initial direction, toward a plurality of detectors positioned at peripheral locations relative to the planar layer. The method further includes receiving the directed electromagnetic wave signal at the plurality of detectors. The method additionally includes, based on the directed electromagnetic wave signal received at the plurality of detectors, estimating a position of the user-controlled light source.

28 Claims, 15 Drawing Sheets

(56) References Cited

U.S. PATENT DOCUMENTS

| | | | |
|---|---|---|---|
| 2011/0266423 A1* | 11/2011 | Koeppe et al. | 250/227.31 |
| 2012/0038591 A1* | 2/2012 | Chen et al. | 345/175 |
| 2012/0120027 A1* | 5/2012 | Ebner | 345/175 |
| 2012/0162136 A1* | 6/2012 | Chen et al. | 345/175 |
| 2012/0218215 A1 | 8/2012 | Kleinert et al. | |
| 2012/0262422 A1* | 10/2012 | Liao | 345/175 |

* cited by examiner

SYSTEM AND METHOD FOR OPTICALLY-BASED ACTIVE STYLUS INPUT RECOGNITION

BACKGROUND

The present disclosure relates generally to a stylus technology, and more particularly, to a system and method for optically-based active stylus input recognition.

Touch sensitive devices can generally allow a user to perform various functions by touching or hovering over a touch sensor panel using one or more fingers, a stylus or other object at a location often dictated by a user interface (UI) including virtual buttons, keys, bars, displays, and other elements, being displayed by a display device. In general, touch screens can recognize a touch event and the position of the touch event on the touch sensor panel or a hover event and the position of the hover event on the touch sensor panel, and the computing system can then interpret the touch or hover event in accordance with the display appearing at the time of the event, and thereafter can perform one or more operations based on the event.

Devices such as computing devices, mobile devices, kiosks, etc. often employ a stylus with which a user can interact with the devices by using the stylus input on a touch screen display. The stylus has demonstrated to be an effective input device and important differentiator in computing and mobile devices. The stylus can allow a user to perform various functions by touching the touchscreen or by hovering the stylus over it. In general, devices with touch screens can recognize the position of the touches with the stylus, and can then interpret the touches, either individually or as a single gesture in accordance with the display appearing at the time of the touch event, and thereafter can perform one or more actions based on the touch event. However, many stylus implementations have high power consumption, are expensive, and are not easy to scale to large areas. A conventional stylus is often simply a conductive rod with a finger-sized rounded tip large enough to disrupt the electric field lines between the drive and sense electrodes of a capacitive touch sensor panel.

Accordingly, a need exists for low-power and low-cost active stylus based input recognition.

BRIEF SUMMARY

Certain embodiments are described that determine a system and method for optically-based active stylus input recognition.

In some embodiments, a method includes, from an active light source capable of being handled by a user, emitting an electromagnetic wave signal in an initial direction toward a planar layer. The method also includes directing the electromagnetic wave signal in one or more lateral directions different from the initial direction, toward a plurality of detectors positioned at peripheral locations relative to the planar layer. The method further includes receiving the directed electromagnetic wave signal at the plurality of detectors. The method additionally includes, based on the directed electromagnetic wave signal received at the plurality of detectors, estimating a position of the user-controlled light source.

In some embodiments, the electromagnetic wave signal is emitted from an active stylus device.

In some embodiments, the electromagnetic wave signal comprises infrared light.

In some embodiments, the plurality of detectors comprise a plurality of photodetectors operable to determine intensity measurements of the directed electromagnetic wave signal.

In some embodiments, the estimating step comprises determining a position of the stylus device relative to the planar layer, wherein the position is a function of the intensity measurements.

In some embodiments, the planar layer is one of a plurality of layers within a display device.

In some embodiments, the planar layer comprises a scatter plate operable to perform the directing step.

In some embodiments, an apparatus includes a planar layer operable to receive electromagnetic wave signal emitted, from an active light source capable of being handled by a user, at an initial direction and direct the electromagnetic wave signal in one or more lateral directions different from the initial direction. The apparatus further includes a plurality of detectors positioned at peripheral locations relative to the planar layer and operable to receive the directed electromagnetic wave signal. The apparatus additionally includes a processor coupled to the plurality of detectors, wherein the processor is configured to, based on directed electromagnetic wave signal received at the plurality of detectors, estimate a position of the active light source.

In some embodiments, an apparatus includes means for, from an active light source capable of being handled by a user, emitting an electromagnetic wave signal in an initial direction toward a planar layer. The apparatus further includes means for directing the electromagnetic wave signal in one or more lateral directions different from the initial direction toward a plurality of detectors positioned at peripheral locations relative to the planar layer. The apparatus additionally includes means for receiving the directed electromagnetic wave signal at the plurality of detectors. The apparatus also includes means for, based on the directed electromagnetic wave signal received at the plurality of detectors, estimating a position of the user-controlled light source.

In some embodiments, a processor-readable non-transitory medium comprising processor readable instructions Is configured to cause a processor to, from an active light source capable of being handled by a user, emit an electromagnetic wave signal in an initial direction toward a planar layer. The instructions are further configured to cause the processor to direct the electromagnetic wave signal in one or more lateral directions different from the initial direction, toward a plurality of detectors positioned at peripheral locations relative to the planar layer. The instructions are also further configured to cause the processor to receive the directed electromagnetic wave signal at the plurality of detectors. The instructions are additionally further configured to cause the processor to, based on the directed electromagnetic wave signal received at the plurality of detectors, estimate a position of the user-controlled light source.

BRIEF DESCRIPTION OF THE DRAWINGS

Aspects of the disclosure are illustrated by way of example. In the accompanying figures, like reference numbers indicate similar elements and.

DETAILED DESCRIPTION

Figure 1:
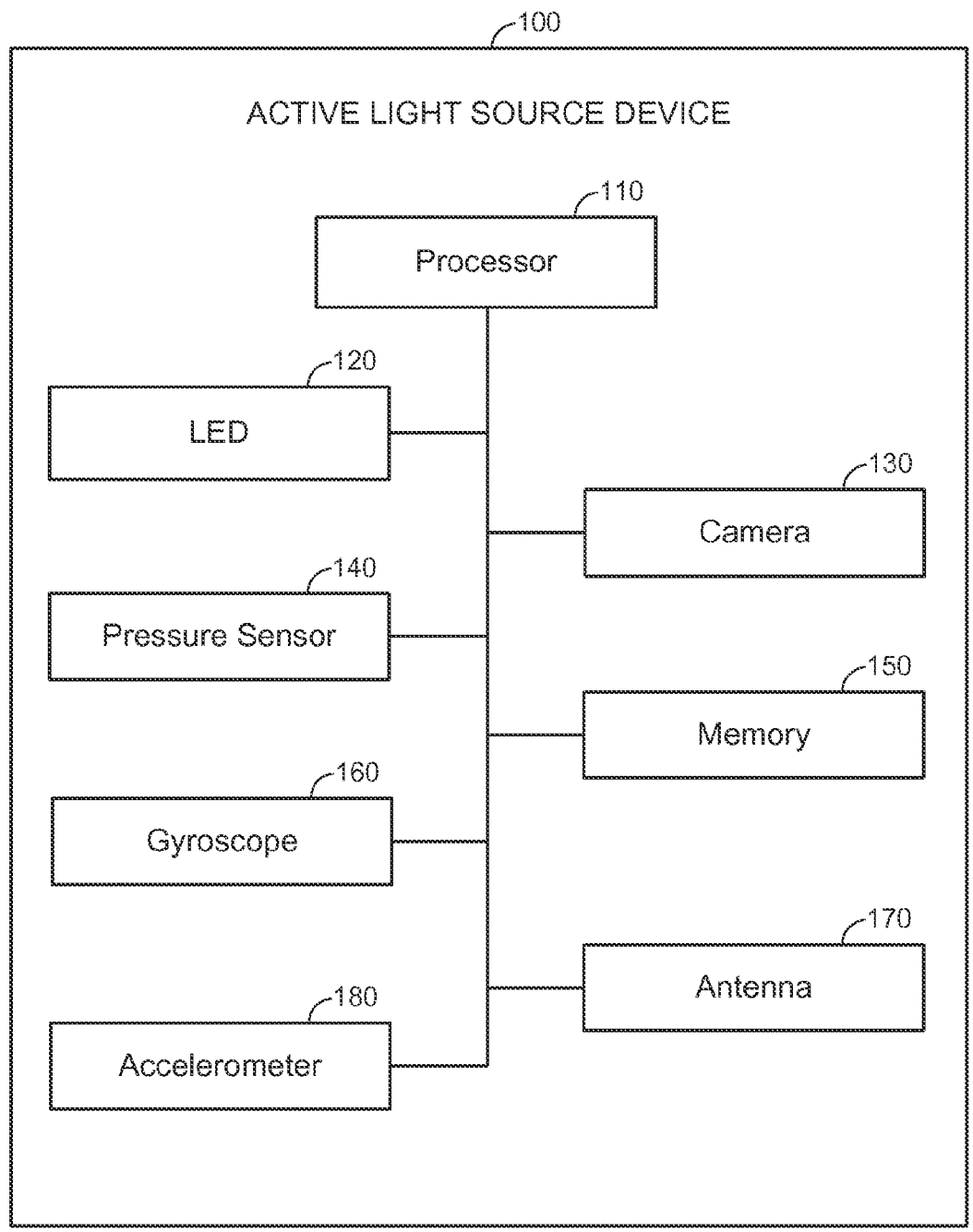
FIG. 1 is a block diagram of components of an active light source device 100 according to an embodiment of the present invention.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of stylus technology will now be presented with reference to various apparatus and methods. These apparatus and methods will be described in the following detailed description and illustrated in the accompanying drawings by various blocks, modules, components, circuits, steps, processes, algorithms, etc., (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Discussed here is an optical-based stylus technology implemented within a device that uses optical measurements (e.g., intensity, time-of-flight, detector with angular resolution, etc.) from a plurality of photodetectors to locate the position of an active light source device relative to a planar surface. The input recognition device includes, but is not limited to, a transparent scatter plate layer and a plurality of photodetectors. The photodetectors may be positioned at peripheral locations relative to the transparent scatter plate layer. The transparent scatter plate may be a planar layer overlaid above a display of a device for which the input recognition is employed. While a user interacts with the device using the active light source device, the active light source device emits IR light toward the scatter plate layer. The scatter plate layer may direct at least some of the light laterally toward the photodetectors located at peripheral locations relative to the scatter plate layer. The light intensity of the directed light $I_{di}$ at each photodetector is directly related to the distance of the active light source device $d_i$ to the corresponding photodetector. Using this relationship, $r_{di}=f(I_{di})$, the position of the active light source device can be located by using the light intensity measurements from the individual photodetectors. The position of the active light source device relative to the display of the input recognition device may then be determined using triangulation techniques.

Active Light Source Device

FIG. 1 is a block diagram of components of an active light source device 100, according to an embodiment of the present invention. Active light source device 100 includes a light-emitting diode (LED) 120, memory 150, gyroscope 160, and accelerometer 180. In some embodiments, active light source device 100 may include components for functioning as an active infrared stylus device. It can be appreciated that other embodiments may include more, fewer and/or different components.

In some embodiments, the components may be mounted on a printed circuit board (PCB) that may be positioned within the active light source device 100. In other embodiments, some components may be mounted on the PCB and others not.

Processor 110 may be any general purpose processor operable to carry out instructions on the active light source device 100. The processor 110 is coupled to other units of the active light source device 100 including LED 120, memory 150, gyroscope 160, and accelerometer 180. In some embodiments, the processor 110 may be configured to receive data from the other units of the active light source device 100.

LED 120 is a light source configured to emit light from the active light source device 100. It can be appreciated that the active light source device 100 may include more than one LED 120. In some embodiments, the LED 120 may emit in a non-visible portion of the electromagnetic spectrum, such as the infrared (IR) spectrum.

Memory 150 may be configured to store operating instructions for the processor 110. In some embodiments, the memory 150 may be configured to stare data received from the other units of the active light source device 100. Memory 150 may be any magnetic, electronic, or optical memory. It can be appreciated that memory 150 may include any number of memory modules. An example of memory 150 may be dynamic random access memory (DRAM).

In some embodiments, one or more accelerometer(s) 180 may be provided with the active light source device 100 as well as a gyroscope 160. The accelerometer(s) 180 and gyroscope 160 may be useful in determining the orientation of the active light source device 100 and/or any movement of the active light source device 100. The orientation and movement information provided by the accelerometer(s) 180 and gyroscope 160 may be used for determining orientation and movement of the active light source device 100 relative to an input recognition device 200.

Input Recognition Device

Figure 2:
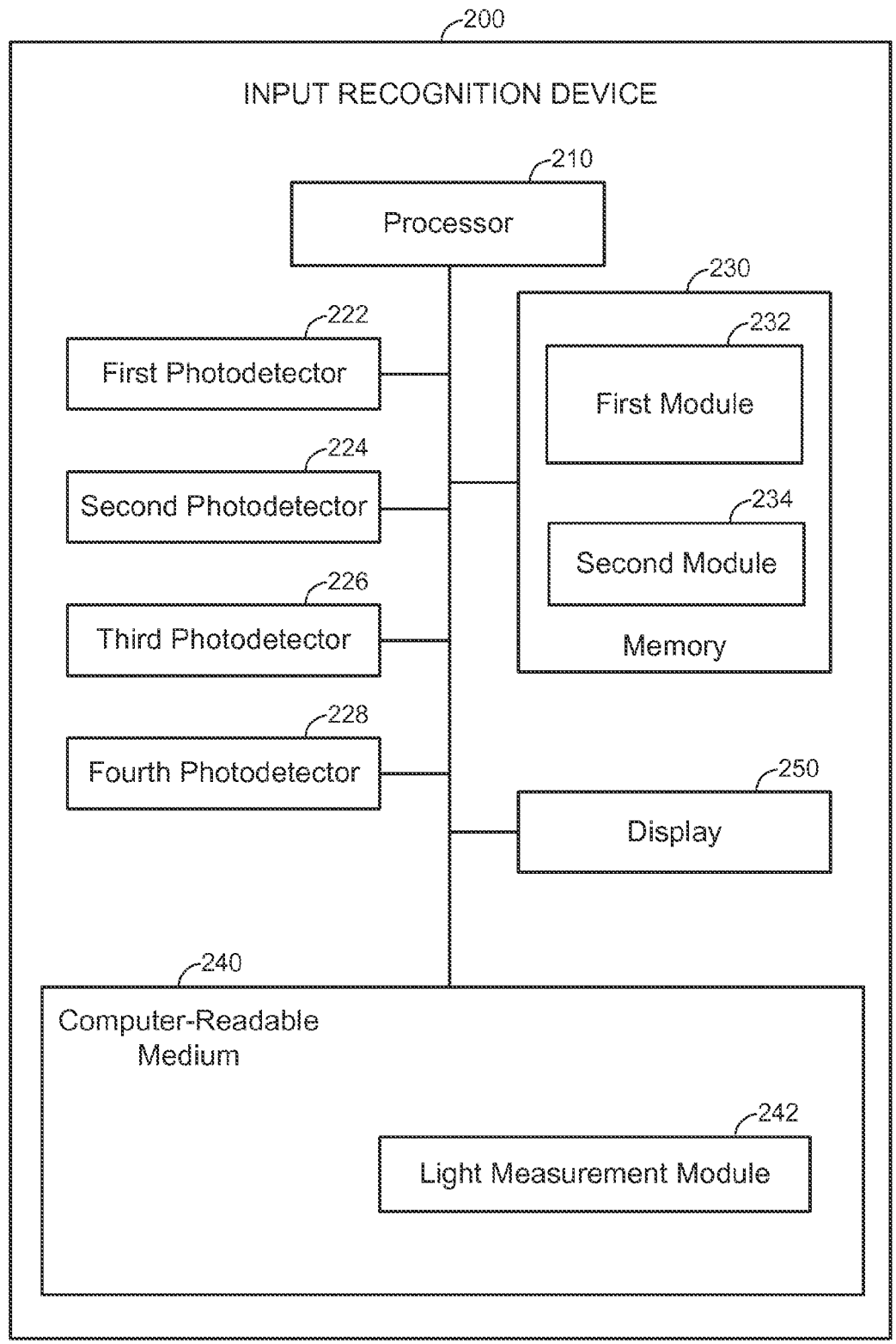
FIG. 2 is a block diagram of components of an input recognition device, according to an embodiment of the present invention.

FIG. 2 is a block diagram of components of an input recognition device 200, according to an embodiment of the present invention. Input recognition device 200 includes a processor 210, first photodetector 222, second photodetector 224, third photodetector 226, fourth photodetector 228, computer-readable medium 240, and display 250. It can be appreciated that while four photodetectors are depicted in FIG. 2, the input recognition device 200 may include any number of photodetectors. In some embodiments, the input recognition device 200 may be a tablet computer, smartphone, or other computing device and may include additional components other than the ones depicted in FIG. 2.

Processor 210 may be any general-purpose processor operable to carry out instructions on the input recognition device 200. The processor 210 is coupled to other units of the input recognition device 200 including first photodetector 222, second photodetector 224, third photodetector 226, fourth photodetector 228, computer-readable medium 240, and display 250.

Display 250 may be any device that displays information to a user. Examples may include an LCD screen, CRT monitor, or seven-segment display. In some embodiments, display 130 may be a configured to receive user input. In other embodiments, the display 250 may include a transparent scatter plate layer operable to direct received light from the active light source device 100 (FIG. 1) toward the plurality of photodetectors. The transparent scatter plate may be a planar layer overlaid above, below, adjacent, or anywhere near the display layer of the display for which the input recognition is employed. While the user interacts with the input recognition device 200 using the active light source device 100 (FIG. 1), the active light source device 100 (FIG. 1) may emit IR light toward the transparent scatter plate layer.

The plurality of photodetectors (first photodetector 222, second photodetector 224, third photodetector 226, and fourth photodetector 228) may be positioned at peripheral locations relative to a transparent scatter plate layer within the display 250, as described above. The scatter plate may direct at least some of the light laterally toward the photodetectors located at peripheral locations relative to the scatter plate. The light intensity of the directed light $I_{di}$ at each photodetector may be directly related to the distance of the stylus $d_i$ to the corresponding photodetector. Using this relationship, $r_{di}=f(I_{di})$, the position of the active light source device 100 (FIG. 1) can be located by using the light intensity measurements from the individual photodetectors (first photodetector 222, second photodetector 224, third photodetector 226, and fourth photodetector 228). The position of the active light source device 100 (FIG. 1) relative to the display 250 of the input recognition device 200 may then be determined using triangulation techniques.

Memory 230 may be any magnetic, electronic, or optical memory. Memory 230 includes two memory modules, first module 232 and second module 234. It can be appreciated that memory 230 may include any number of memory modules. An example of memory 230 may be dynamic random access memory (DRAM).

Computer-readable medium 240 may be any magnetic, electronic, optical, or other computer-readable storage medium. Computer-readable storage medium 240 stores computer-readable code comprising code modules, including light measurement module 242.

The light measurement module 242 contains code that, when executed by processor 210, analyzes the intensity of the IR light received at each of the photodetectors (first photodetector 222, second photodetector 224, third photodetector 226, and fourth photodetector 228). In some embodiments, the light measurement module 242, may also detect when the IR light is actually received at any of one the photodetectors. Upon detecting the IR light being received at one of the photodetectors, the light measurement module 242 may determine the intensity of the IR light at the photodetector(s) that received the IR light. As described above, the position of the active light source device 100 relative to the display 250 of the input recognition device 200 may be determined based on the determined light intensity measurements at the plurality of photodetectors.

Figure 3:
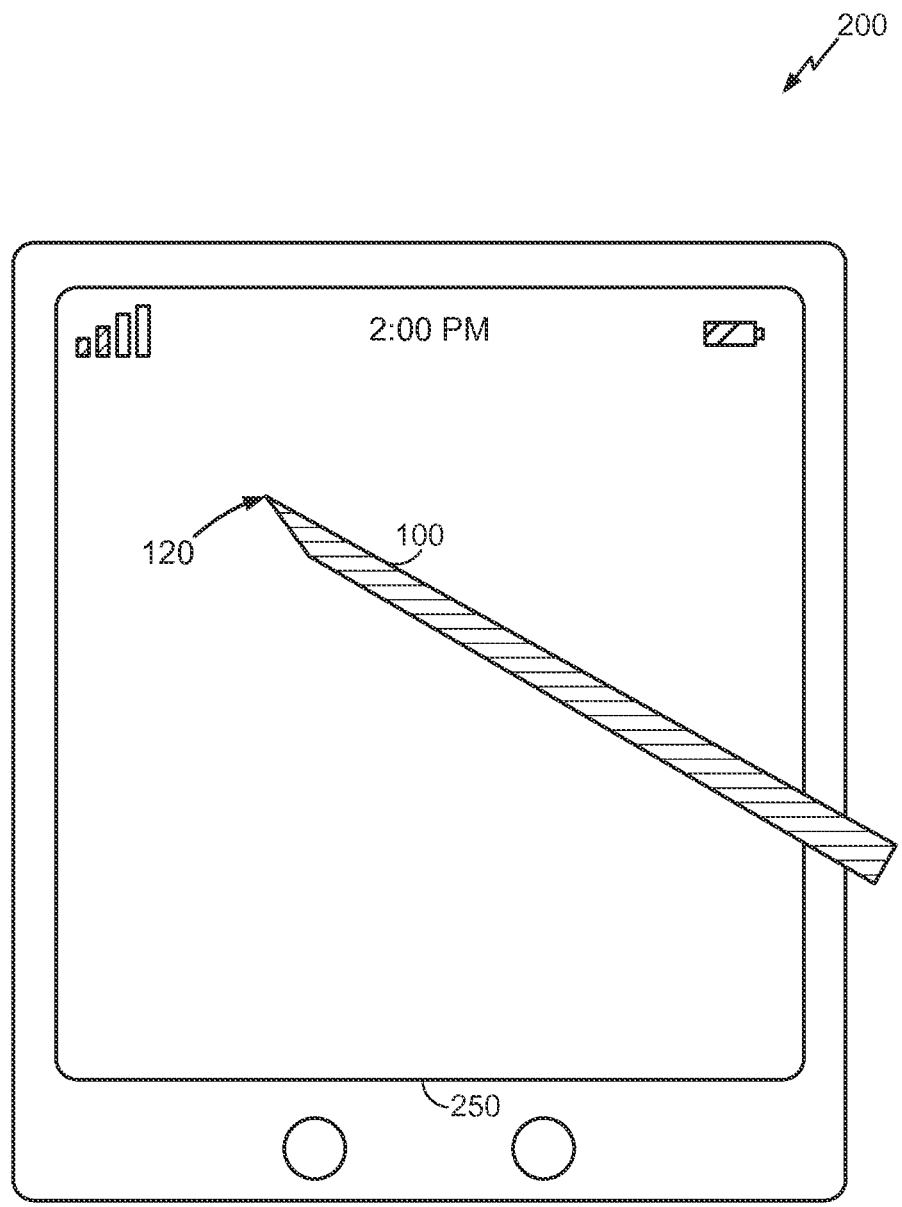
FIG. 3 is a diagram illustrating the input recognition device interacting with the active light source device, according to an embodiment of the present invention.

FIG. 3 is a diagram illustrating the input recognition device 200 interacting with the active light source device 100, according to an embodiment of the present invention. The active light source device 100 may be operable by a user of the input recognition device 200. In this particular example, the input recognition device 200 is depicted as a tablet computer, however it can be appreciated that the input recognition device 200 can be any type of computing device. The active light source device 100 may also include a LED 120 at an end of the active light source device 100 configured to emit infrared light toward the display 250 of the input recognition device 200. Even though the LED 120 is shown at the end of the active light source device 100, it can be appreciated that LED 120 may be located elsewhere within the active light source device 100.

As the user uses the active light source device 100 to interact with the input recognition device 200, the LED 120 may emit infrared light toward the display 250. When interacting with the input recognition device 700 the user may physically touch the display 250 with the end of the active light source device 100 or may also use the active light source device 100 at a nominal distance from the display 250.

As described above, a transparent scatter plate layer (not shown) may overlay a display layer of the display 250. However, the transparent scatter plate layer need not directly overlay the display layer of the display 250 and may be placed at any layer within a display layer stack of the display 250. Upon the LED 120 emitting the infrared light toward the display 250, the transparent scatter plate layer may direct at least some of the received IR light laterally toward a plurality of photodetectors located at peripheral locations relative to the scatter plate layer. The light intensity of the directed light $I_{di}$ at each photodetector is directly related to the distance of the stylus $d_i$ to the corresponding photodetector. Using this relationship, $r_{di}=f(I_{di})$, the position of the active light source device 100 can be located by using the light intensity measurements from the individual photodetectors. The position of the active light source device 100 relative to the display 250 may then be determined using triangulation techniques.

Using the determined position information of the active light source device 100 relative to the display 250, processor 210 (FIG. 2) of the input recognition device 200 may execute a command. For example, if the position of the active light source device 100 is determined to be above an "OK" prompt being displayed by software running on the input recognition device 200 and displayed on display 250, the processor 210 (FIG. 2) may execute a command associated with acceptance of the "OK" prompt by the user.

Transparent Scatter Plate Layer

Figure 4A:
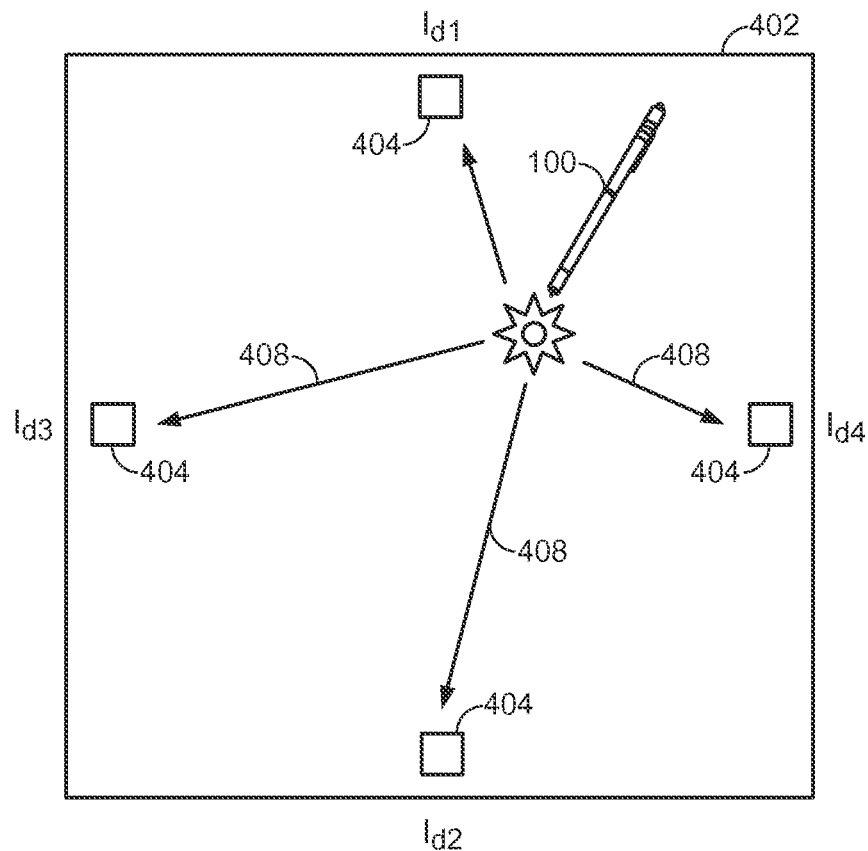
FIG. 4A is a diagram illustrating a top-down view of a transparent scatter plate layer of the input recognition device, according to an embodiment of the present invention.

FIG. 4A is a diagram illustrating a top-down view of a transparent scatter plate layer 402 of input recognition device 200 (FIG. 2), according to an embodiment of the present invention. Also shown in FIG. 4A is the active light source device 100 (FIG. 1). As described above, the transparent scatter plate layer 402 may be a planar layer overlaid above, below, adjacent, or anywhere near the display layer of the display 250 (FIG. 2) of the input recognition device 200.

The transparent scatter plate layer 402 includes a plurality of photodetectors 104. In some embodiments, the plurality of photodetectors are positioned a peripheral locations relative to the transparent scatter plate layer 402. While the embodiment depicted in FIG. 4A illustrates four photodetectors, any number of photodetectors may be positioned at a variety of locations relative to the transparent scatter plate layer 402.

The plurality of photodetectors may be any type of device that detects or responds to incident light by using the electrical effect of individual photons.

Upon use of the active light source device 100, by the user, to interact with the input recognition device 200, the active light source device 100 may emit IR light 408 in a direction toward the transparent scatter plate layer 402. The transparent scatter plate layer 402 may include scatter elements that can direct the IR light 408 emitted from the active light source device 100. In this example, the transparent scatter plate layer 402 may direct the IR light 408 toward the plurality of photodetectors 404, which in some embodiments are positioned at peripheral locations relative to the transparent scatter plate layer 402. That is, the IR light 408 may be directed in a direction different from the direction originally emitted from the active light source device 100.

The intensity of the directed IR light received at each of the plurality of photodetectors 404 may be different, as indicated by the intensity values associated with each photodetector 404 (e.g., $i_{d1}$, $i_{d2}$, $i_{d3}$, and $i_{d4}$). Upon determining the different intensity values at each of the photodetectors 404 via the light measurement module 242 (FIG. 2), the processor 210 may determine the position of the active light source device 100. In some embodiments, the transparent scatter plate layer 402 may be composed of an acrylic layer.

Figure 4B:
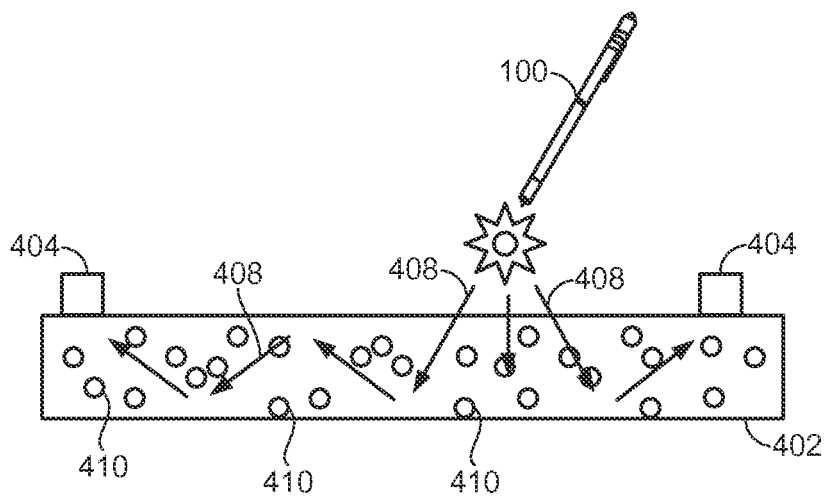
FIG. 4B is a diagram illustrating a cross-sectional view of the transparent scatter plate layer of the input recognition device, according to an embodiment of the present invention.

FIG. 4B is a diagram illustrating a cross-sectional view of the transparent scatter plate layer 402 of input recognition device 200 (FIG. 2), according to an embodiment of the present invention. FIG. 4B shows the same transparent scatter plate layer 402 of FIG. 4A from a cross-sectional viewpoint. Depicted in FIG. 4B are a plurality of scatters 410 within the transparent scatter plate layer 402. The plurality of scatters 410 are operable to direct the IR light 408 in different directions other than the direction the IR light is emitted in by the active light source device 100. Eventually, at least some of the light scattered by the plurality of scatters 410 will be arrive at the plurality of photodetectors 404.

Figure 5:
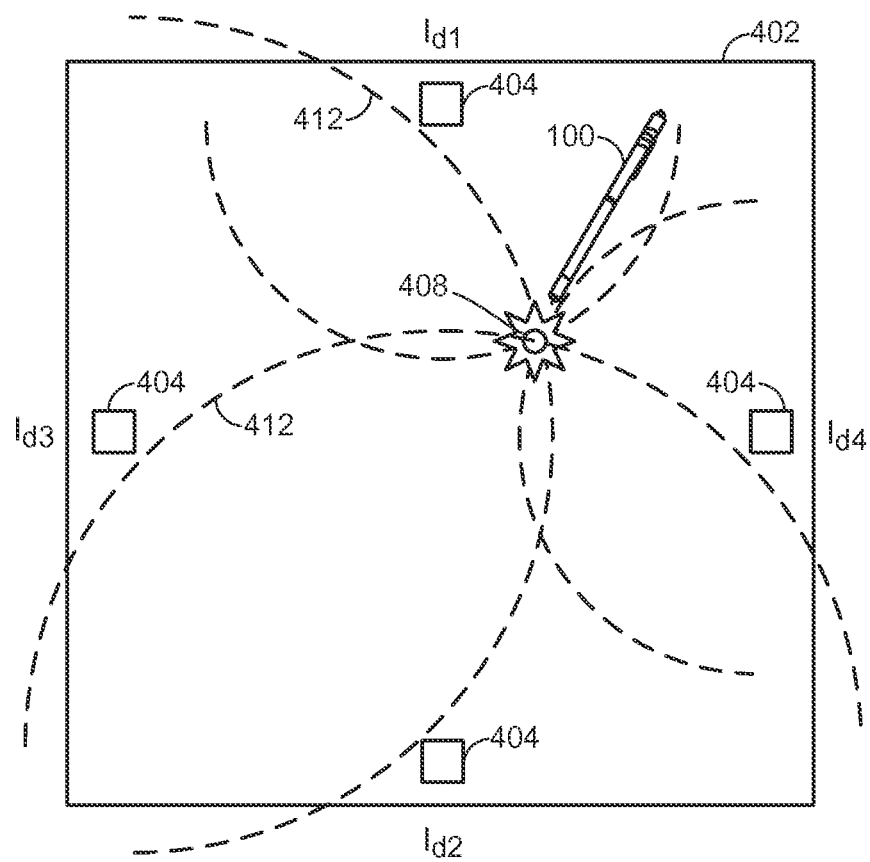
FIG. 5 is a diagram illustrating determining a position of the active light source device relative to the transparent scatter plate layer, according to an embodiment of the present invention.

FIG. 5 is a diagram illustrating determining a position of the active light source device 100 relative to the transparent scatter plate layer 402, according to an embodiment of the present invention. Once the IR light 408 is emitted by the active light source device 100, as described above, the plurality of photodetectors 404 may detect the IR light 408 directed by the transparent scatter plate layer 402. The light intensity of the directed light $I_{di}$ at each photodetector 404 is directly related to the distance of the active light source device 100 $d_i$ to the corresponding photodetector 404. Using this relationship, $r_{di}=f(I_{di})$, the position of the active light source device 100 can be located by using the light intensity measurements from the individual photodetectors 404. For example, when photodetector $d_1$ receives IR light 408 at an intensity $I_{d1}$, it may be determined that the active light source device 100 is positioned a point of a circle 412 that has a radius of $r_{d1}=f(I_{d1})$ around the location of the photodetector $d_1$. In this example, based on the four light intensity measurements at each of the four photodetectors 404, a determination may be made that the active light source device 100 is located, relative to the transparent scatter plate layer 402, at the intersection of all four circles 412. It can be appreciated that while four photodetectors 404 are shown, any number of photodetectors 404 may be used in the transparent scatter plate layer 402 of the input recognition device 200 (FIG. 2). Further, it can also be appreciated that the photodetectors 404 may be located anywhere on the transparent scatter plate layer 402.

Accuracy and Jitter Results

Figure 6:
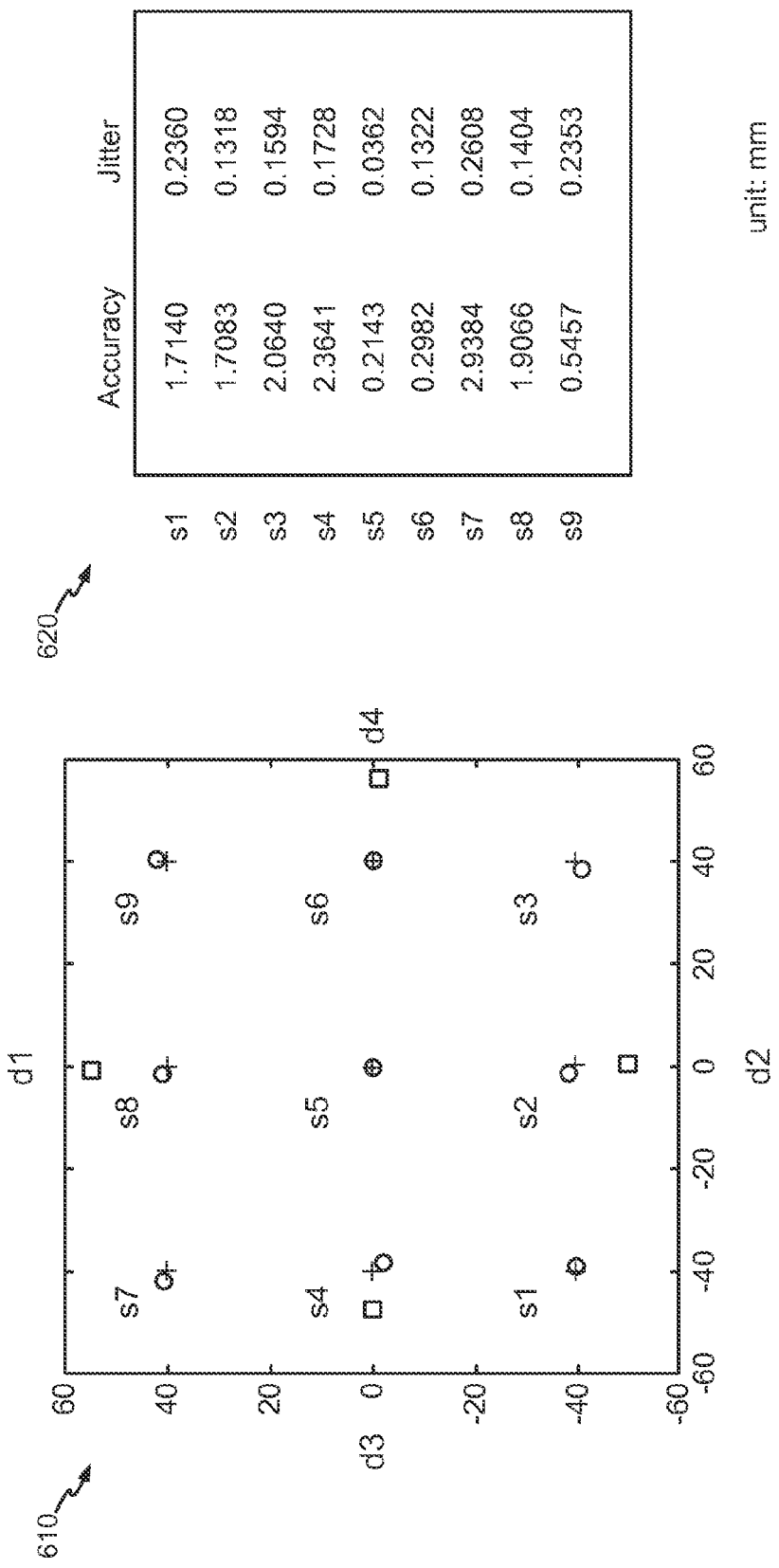
FIG. 6 illustrates a graph and table depicting the accuracy and jitter performance of the input recognition device at nine different input recognition device locations on the display.

FIG. 6 illustrates a graph 610 and table 620 depicting the accuracy and jitter performance of the input recognition device 200 (FIG. 12) at nine active light source device 100 (FIG. 1) locations on the display 250 (FIG. 1). The table 620 in FIG. 6 illustrates results of a feasibility experiment using the input recognition device 200 (FIG. 2). The results show that the input recognition device 200 (FIG. 2) achieves a comparable resolution as current input recognition technologies. Accuracy and jitter measurements were used to characterize the resolution. Accuracy characterizes the difference between the calculated active light source device 100 (FIG. 1) position and the actual active light source device 100 (FIG. 1) position on the display 250 (FIG. 1). Jitter characterizes, when the calculated active light source device 100 (FIG. 1) and actual active light source device 100 (FIG. 1) position are fixed, the uncertainty of the calculated active light source device 100 (FIG. 1) positions among different trails due to noise. The graph 510 on the left-hand side of FIG. 6 illustrates positions of various described components within the input recognition device 200 (FIG. 2). The squares indicate locations of the photodetectors 404 (FIG. 4), the positive signs indicate the nine actual locations of the active light source device 100 (FIG. 1), and the circles indicate the calculated positions of the active light source device 100 (FIG. 1) at the corresponding actual positions of the active light source device 100 (FIG. 1). The table 620 on the right-hand side of FIG. 6 illustrates accuracy and jitter measurements for each of the nine active light source 100 (FIG. 1) positions. As can be seen, the accuracy of each of the positions falls within 0-3 mm and the jitter measurements fall between 0-0.3 mm.

Using Conical Facets to Direct Light

It can be appreciated that other embodiments of the invention may provide different characteristics. For example, the light emitted by the active light source device 100 (FIG. 1) may be scattered differently based on the design of the transparent scatter plate layer.

Figure 7:
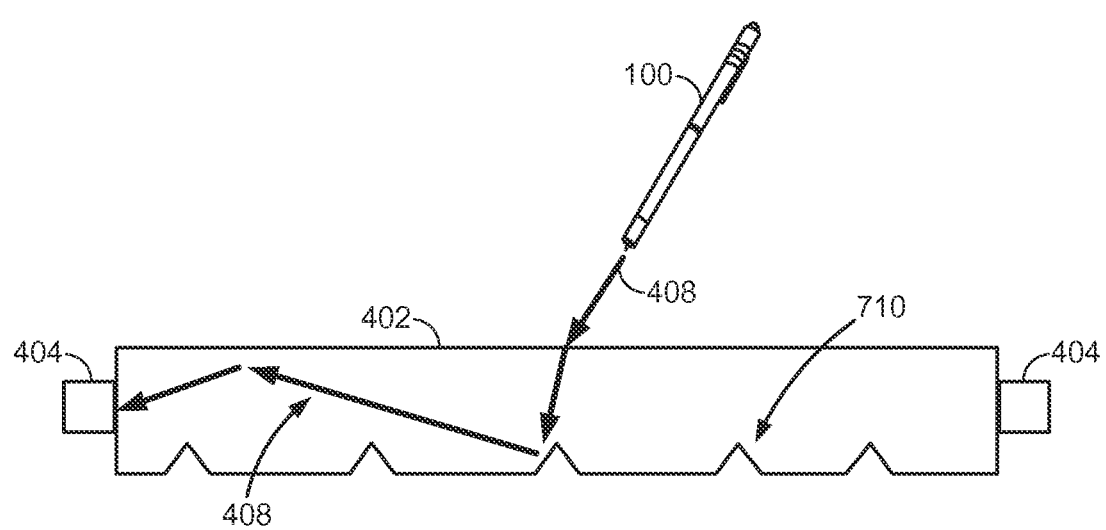
FIG. 7 is a diagram illustrating a cross-sectional view of an embodiment of the transparent scatter plate layer wherein a light turning mechanism is supplied by an array of conical facets, according to an embodiment of the present invention.

FIG. 7 is a diagram illustrating a cross-sectional view of an embodiment of the transparent scatter plate layer 402 wherein a light turning mechanism is supplied by an array of conical facets 710, according to an embodiment of the present invention. That is, the conical facets 710 direct the IR light 408 emitted from the active light source device 100 toward the transparent scatter plate layer 402. The light may be directed in any different direction different from the direction the IR light 408 was originally emitted in by the active light source device 100. The directed IR light 408 may be received by the plurality of photodetectors 404.

The embodiment in FIG. 7 shows scattering centers that may turn a portion of incident radiation through large enough angles to cause that radiation to be trapped inside the transparent scatter plate layer 402. The facets may be made by, for example, an embossing technique. At times, this scattering may tend to be directed isotropically causing nearly 50% of the incident light to be scattered out of the transparent scatter plate layer 402. FIG. 7 illustrates the geometry of the embodiment of FIG. 5, whereby a light turning mechanism is supplied by an array of conical facets 710. As such, a higher percentage of IR light 408 incident to such conical facets 710 may be trapped into the transparent scatter plate layer 402. It can be appreciated that the facets 710 may be contained in a separate layer that is laminated or optically attached to the transparent scatter plate layer 402.

It can be appreciated that the conical facets may provide an advantage in that a greater amount of light may be trapped and directed within the transparent scatter plate layer 402.

Using Circular Facets to Direct Light

Figure 8:
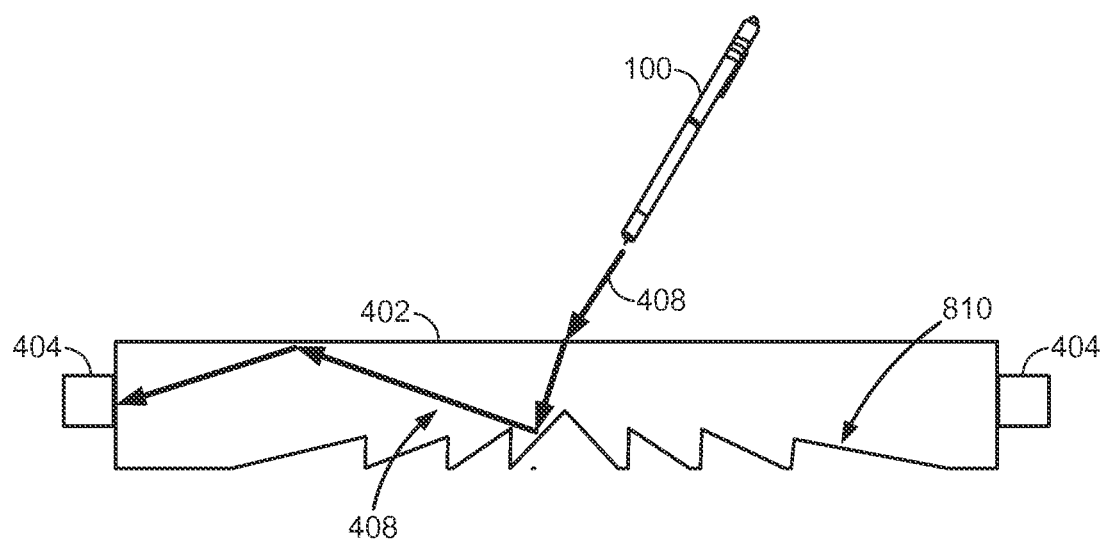
FIG. 8 is a diagram illustrating a cross-sectional view of an embodiment of the transparent scatter plate layer wherein the facets are circular with the center of curvature coinciding with the center of the display panel of the display of input recognition device, according to an embodiment of the present invention.

FIG. 8 is a diagram illustrating a cross-sectional view of an embodiment of the transparent scatter plate layer 402 wherein the facets are circular with the center of curvature coinciding with the center of the display panel of the display 250 (FIG. 2) of input recognition device 200 (FIG. 2), according to an embodiment of the present invention. In this example, the normally incident IR light 408 emitted from the active light source device 100 strikes a facet 810 and is turned in one direction away from the center of curvature. This implementation enhances the efficiency of the turning and/or collecting of incident IR light 408. It can be appreciated that at least some surface roughness may be required on the facets 810 to ensure enough in plane angular divergence to enable basic intensity based algorithm functionality. This may be important near the periphery of the transparent scatter plate layer 402.

In another embodiment, the scattering particles of the embodiment in FIG. 8 are replaced by fluorescent particles. As such, incident IR light 408 may be absorbed by the fluorescent particles that, in turn, emit light of longer wavelength in all directions. Some of this light is trapped within the light guide and propagates to the periphery of the transparent scatter plate layer 402 for detection.

It can be appreciated that the circular facets may direct the emitted IR light 408 radially rather than isotropically, resulting in higher efficiency.

Estimation of the Light Source Height

Figure 9:
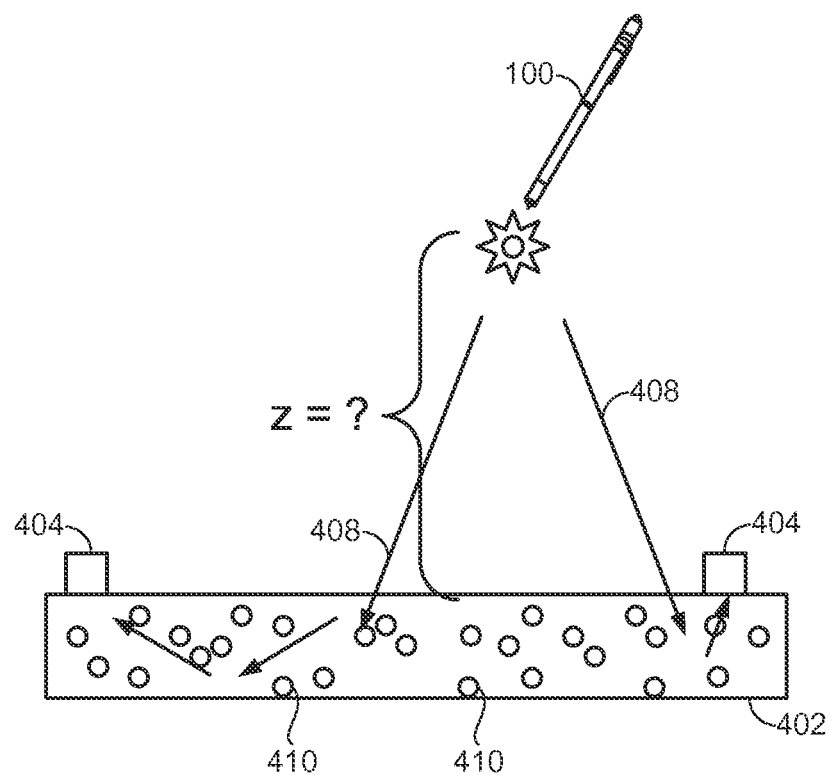
FIG. 9 illustrates the active light source device emitting IR light in two distinct directions, according to an embodiment of the present invention.

FIG. 9 illustrates the active light source device 100 emitting IR light 408 in two distinct directions, according to an embodiment of the present invention. At different heights, the IR light 408 emitted from the active light source device 100 may be emitted at different intensities, as determined by the photodetectors 404. Accordingly, the z (height) position of the active light source device 100 may be triangulated similar to the method described in FIG. 5.

Alternative Photodetectors

Figure 10:
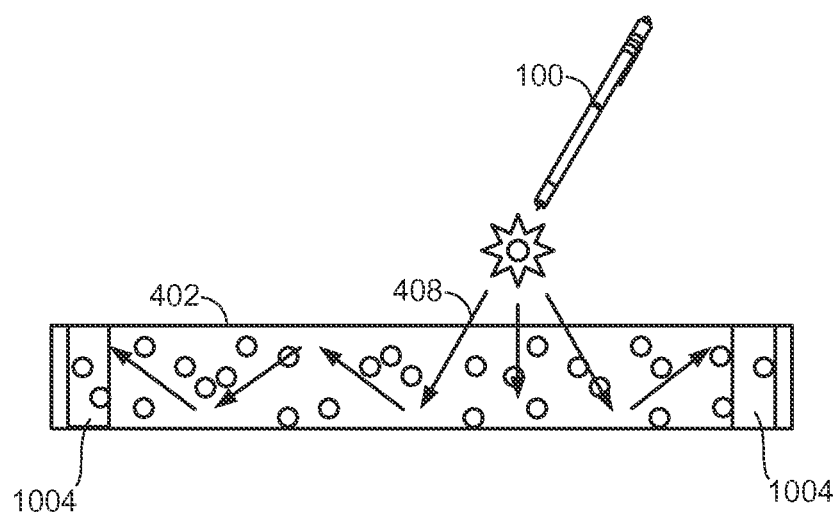
FIG. 10 illustrates the photodetectors as integrated or embedded sensors in the scatter plate, according to an embodiment of the present invention.
Figure 11:
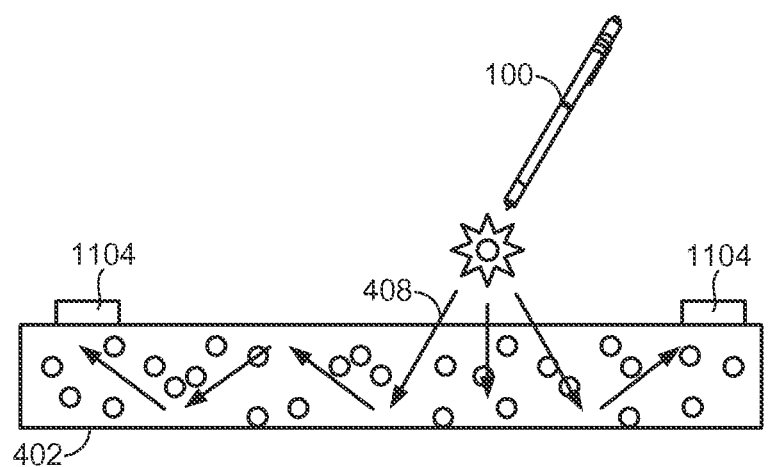
FIG. 11 illustrates the photodetectors as printed sensors on the scatter plate, according to an embodiment of the present invention.

In some embodiments, the photodetectors 404 may be components other than discrete components as illustrated in FIG. 4. For example, FIG. 10 illustrates the photodetectors 1004 as integrated or embedded sensors in the transparent scatter plate layer 402, according to an embodiment of the present invention. In another example, FIG. 11 illustrates the photodetectors 1104 as printed sensors on the transparent scatter plate layer 402, according to an embodiment of the present invention, according to an embodiment of the present invention.

In some embodiments, the scatter plate may include any light turning features of any materials that can change the direction of light propagation. The scatter plate may be flexible with an appropriate substrate material.

In some embodiments, the wavelength of the stylus photodetectors may be in any range of the electromagnetic spectrum.

In some embodiments, the stylus and photodetectors can be modulated to reduce the interference from the ambient light.

In some embodiments, optical measurements by the photodetectors may detect angular resolution (e.g., through pin holes, slits, and lenses), time-of-flight, or a combination of the above. For example, the intensity measurements described above may be combined with time-of-flight information to determine the position of the active light source device. In another example, the intensity measurements may be used as a primary measurement and other measurements (e.g., angular resolution or time-of-flight) may be used as secondary measurements to supplement the primary measurement.

In some embodiments, the optically-based active stylus input recognition system may support multiple user input, e.g. using multiple styluses and photodetectors with different wavelength, frequency, and/or code multiplexing, etc.

Transparent Scatter Plate Positioning

Figure 12A:
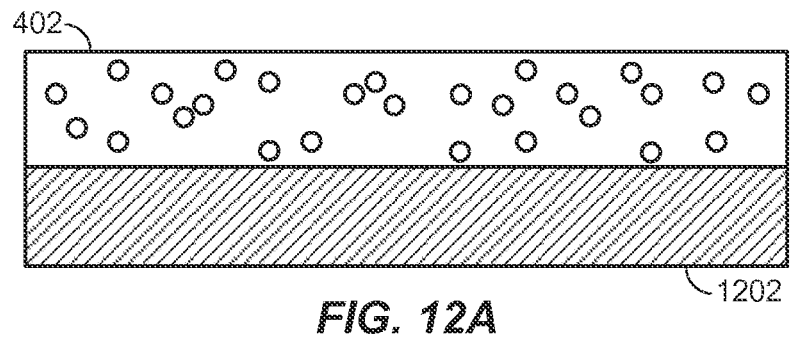
FIG. 12A illustrates the transparent scatter plate layer located above a display layer of the display of input recognition device, according to an embodiment of the present invention.
Figure 12B:
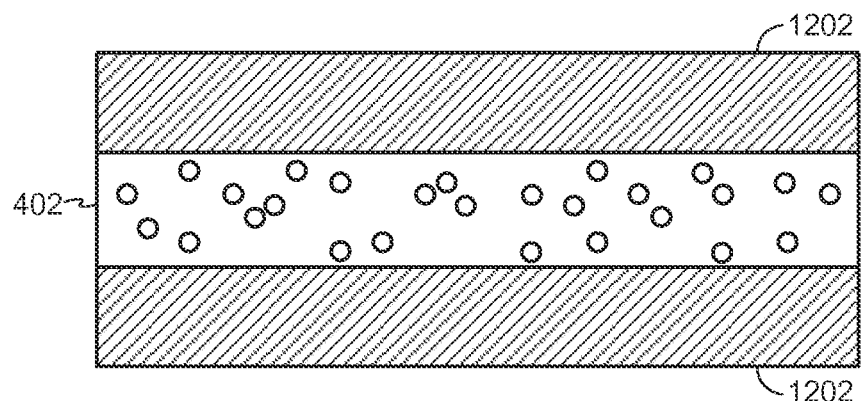
FIG. 12B illustrates the transparent scatter plate layer located between two display layers of the display of input recognition device, according to an embodiment of the present invention.
Figure 12C:
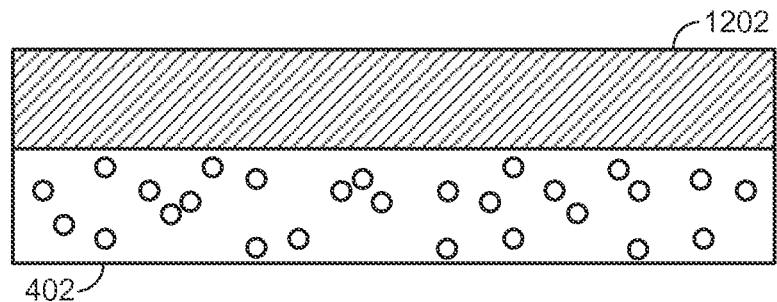
FIG. 12C illustrates the transparent scatter plate layer located below a display layer of the display of input recognition device, according to an embodiment of the present invention.

It can be appreciated that the transparent scatter plate layer 402 (FIG. 4) may be placed in a multitude of locations within a display stack of the display 250 of input recognition device 200 (FIG. 2). In addition to the transparent scatter plate layer and a display layer, the display stack may include many other layers which are well known in the art. The various placements of the transparent scatter plate layer 402 (FIG. 4) may result in different characteristics of how the IR light emitted by the active light source device 100 (FIG. 1) toward the transparent scatter plate layer 402 is directed toward the plurality of photodetectors 404 (FIG. 4). For example, FIG. 12A illustrates the transparent scatter plate layer 402 located above a display layer 1202 of the display 250 of input recognition device 200 (FIG. 2), according to an embodiment of the present invention. In another example, FIG. 12B illustrates the transparent scatter plate layer 402 located between two display layers 1202 of the display 250 of input recognition device 200 (FIG. 2), according to an embodiment of the present invention. In yet another example, FIG. 12C illustrates the transparent scatter plate layer 402 located below a display layer 1202 of the display 250 of input recognition device 200 (FIG. 2), according to an embodiment of the present invention.

Transparent Scatter Plate Layer Components

Figure 13A:
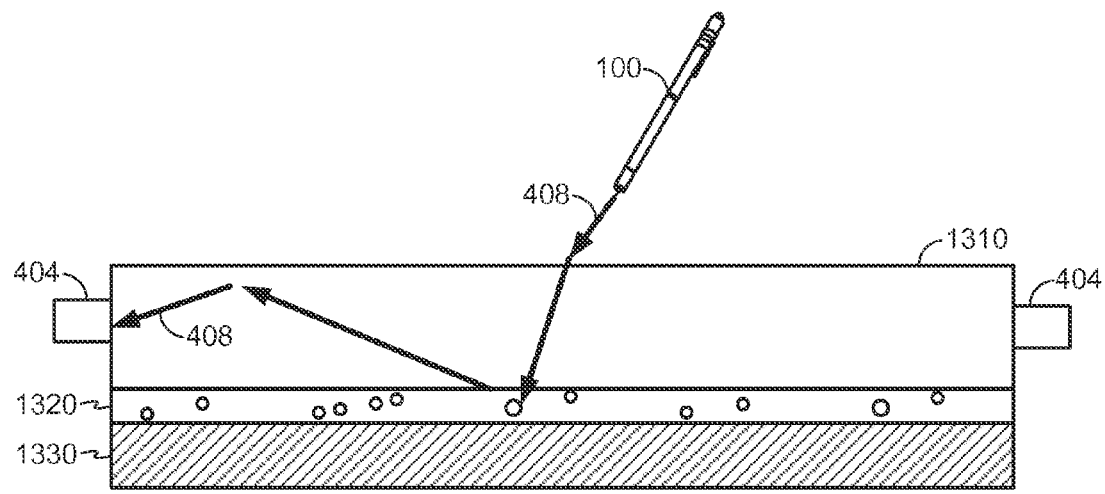
FIG. 13A illustrates the transparent scatter plate layer including a light guide layer, a diffusive pressure sensitive adhesive layer, and a plastic film, according to an embodiment of the present invention.

The transparent scatter plate layer 402 (FIG. 4) may contain various liquid or film materials operable to diffuse the IR light 408 emitted by the active light source device 100. FIG. 13A illustrates the transparent scatter plate layer including a light guide layer 1310, a diffusive pressure sensitive adhesive layer 1320, and a plastic film 1330, according to an embodiment of the present invention. Liquid or film based diffusive materials may contain scattering particles that are operable to direct or diffuse the IR light 408 emitted by the active light source device 100 toward the plurality of photodetectors 404. An example of such a diffusive material is the pressure sensitive adhesive layer 1320 embedded within the transparent scatter plate layer depicted in FIG. 13A. The pressure sensitive adhesive layer 1320 may be used to laminate a film to another film or to glass. This is illustrated with regard to the plastic film 1330 laminated to the light guide layer 1310 via the diffuse pressure sensitive adhesive layer 1320. It can be appreciated that in the embodiment of FIG. 13A, the diffuse pressure sensitive adhesive layer 1320 includes the scattering particles operable to direct or diffuse the IR light 408 emitted by the active light source device 100 in the light guide layer 1310 and toward the plurality of photodetectors 404.

Figure 13B:
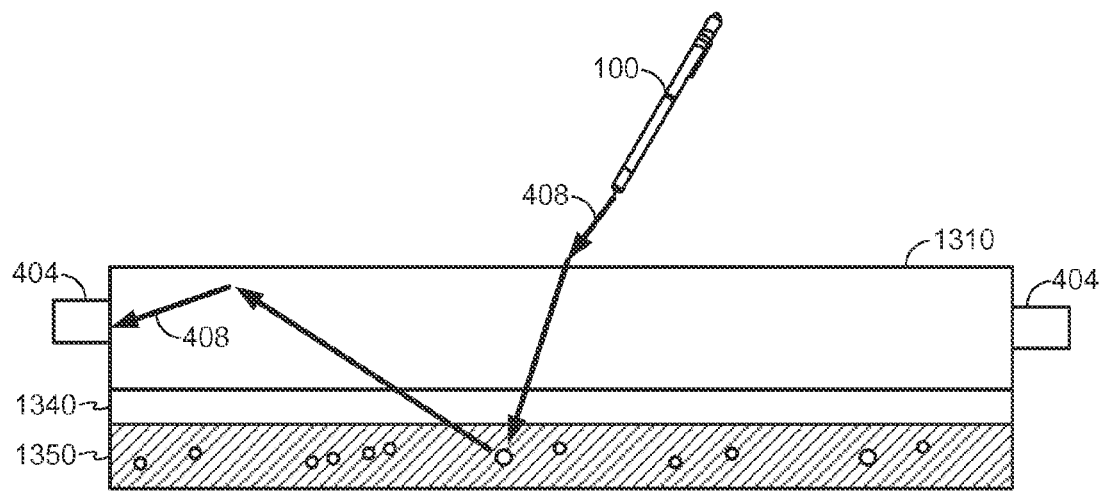
FIG. 13B illustrates the transparent scatter plate layer including a light guide layer, a clear adhesive layer, and a diffuser film layer, according to an embodiment of the present invention.

In another example, FIG. 13B illustrates the transparent scatter plate layer including a light guide layer 1310, a clear adhesive layer 1340, and a diffuser film layer 1350, according to an embodiment of the present invention. The diffuser film 1350 is laminated to the light guide layer 1310 via the clear adhesive layer 1340. FIG. 13B is similar to FIG. 13A except that the diffuser film 1350 contains the scatter particles rather than the diffuse pressure sensitive adhesive layer 1320 as in FIG. 13A. That is, the diffuser film layer 1350 includes the scattering particles operable to direct or diffuse the IR light 408 emitted by the active light source device 100 in the light guide layer 1310 and toward the plurality of photodetectors 404.

Upon receiving the directed IR light 408 at the plurality of photodetectors, a determination of the position of the active light source device 100 relative to the transparent scatter plate layer may be made according to the methods described above.

Method for Optically-Based Active Stylus Input Recognition

Figure 14:
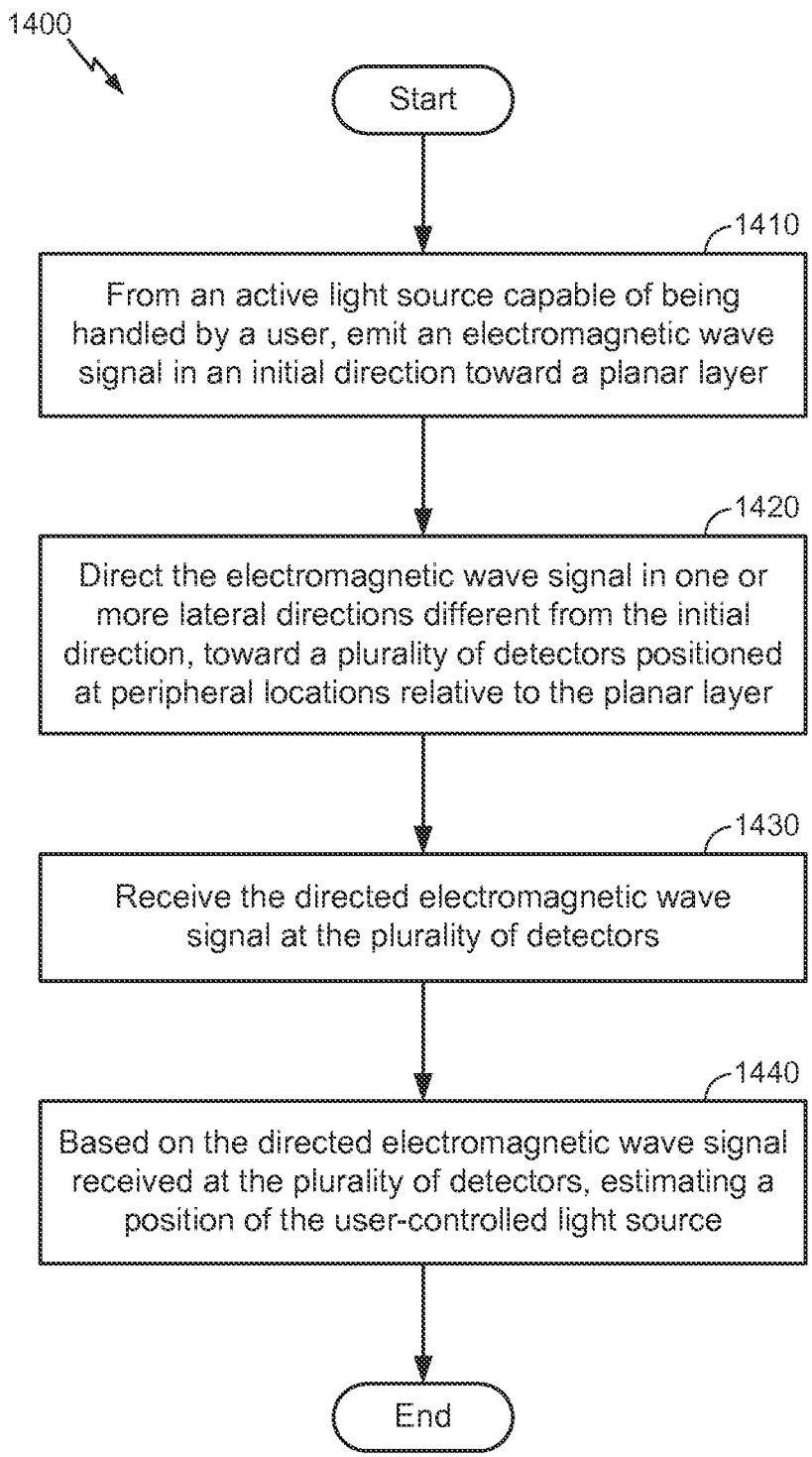
FIG. 14 is a flowchart of a method for optically-based active stylus input recognition.

FIG. 14 is a flowchart 1400 of a method for optically-based active stylus input recognition. In block 1410, from an active light source capable of being handled by a user, an electromagnetic wave signal is emitted in an initial direction toward a planar layer. In some embodiments, the active light source is an active stylus device and the electromagnetic wave signal includes infrared light. The planar layer may be a transparent scatter plate layer within a display stack of a display of an input recognition device. In some embodiments, the planar layer is one of a plurality of layers within a display device.

In block 1420, electromagnetic wave signal is directed in one or more lateral directions different from the initial direction, toward a plurality of detectors positioned at peripheral locations relative to the planar layer. In some embodiments, the plurality of detectors includes a plurality of photodetectors operable to determine intensity measurements of the directed electromagnetic wave signal. The electromagnetic wave signal may be directed in the lateral directions by the transparent scatter plate layer which includes a plurality of scatter elements operable to direct the light.

In block 1430, the directed electromagnetic wave signal is received at the plurality of detectors. A light measurement module within the input recognition device may be configured to detect that the electromagnetic wave signal is received at the plurality of detectors.

In block 1440, based on the directed electromagnetic wave signal received at the plurality of detectors, a position of the user-controlled light source is estimated. In some embodiments, the estimating step comprises determining a position of the stylus device relative to the planar layer, wherein the position is a function of the intensity measurements.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Moreover, nothing disclosed herein is intended to be dedicated to the public.

Exemplary Computing System

Figure 15:
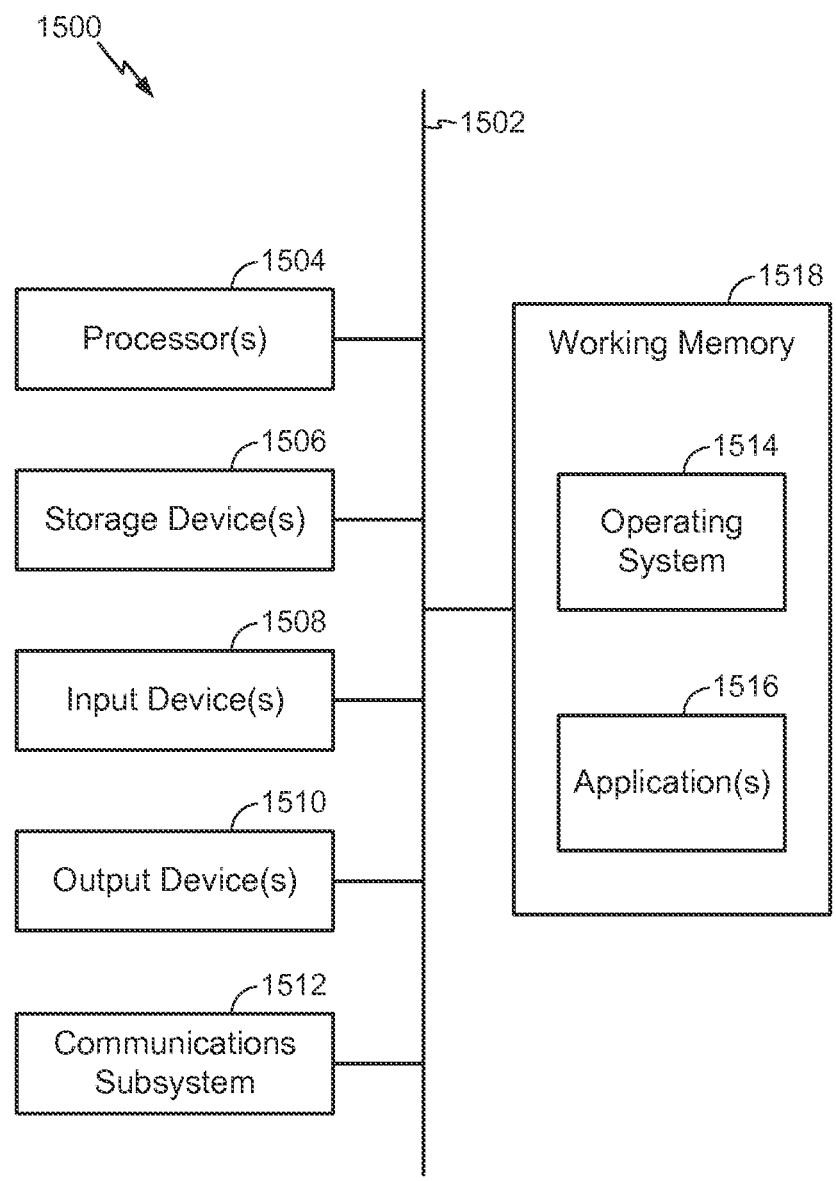
FIG. 15 illustrates an example of a computing system in which one or more embodiments may be implemented.

FIG. 15 illustrates an example of a computing system in which one or more embodiments may be implemented. A computer system as illustrated in FIG. 15 may be incorporated as part of the above described input recognition device. For example, computer system 1500 can represent some of the components of a television, a computing device, a server, a desktop, a workstation, a control or interaction system in an automobile, a tablet, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones and any other hand-held devices. FIG. 15 provides a schematic illustration of one embodiment of a computer system 1500 that can perform the methods provided by various other embodiments, as described herein, and/or can function as the host computer system, a remote kiosk/terminal, a point-of-sale device, a telephonic or navigation or multimedia interface in an automobile, a computing device, a set-top box, a table computer and/or a computer system. FIG. 15 is meant only to provide a generalized illustration of various components, any or all of which may be utilized as appropriate. FIG. 13, therefore, broadly illustrates how individual system elements may be implemented in a relatively separated or relatively more integrated manner. In some embodiments, computer system 1500 may be used to implement functionality of the input recognition device in FIG. 2.

The computer system 1500 is shown comprising hardware elements that can be electrically coupled via a bus 1502 (or may otherwise be in communication, as appropriate). The hardware elements may include one or more processors 1504, including without limitation one or more general-purpose processors and/or one or more special-purpose processors (such as digital signal processing chips, graphics acceleration processors, and/or the like); one or more input devices 1508, which can include without limitation one or more cameras, sensors, a mouse, a keyboard, a microphone configured to detect ultrasound or other sounds, and/or the like; and one or more output devices 1510, which can include without limitation a display unit such as the device used in embodiments of the invention, a printer and/or the like.

In some implementations of the embodiments of the invention, various input devices 1508 and output devices 1510 may be embedded into interfaces such as display devices, tables, floors, walls, and window screens. Furthermore, input devices 1508 and output devices 1510 coupled to the processors may form multi-dimensional tracking systems.

The computer system 1500 may further include (and/or be in communication with) one or more non-transitory storage devices 1506, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1500 might also include a communications subsystem 1512, which can include without limitation a modem, a network card (wireless or wired), an infrared communication device, a wireless communication device and/or chipset (such as a Bluetooth™ device, an 802.11 device, a MR device, a WiMax device, cellular communication facilities, etc.), and/or the like. The communications subsystem 1512 may permit data to be exchanged with a network, other computer systems, and/or any other devices described herein. In many embodiments, the computer system 1500 will further comprise a non-transitory working memory 1518, which can include a RAM or ROM device, as described above.

The computer system 1500 also can comprise software elements, shown as being currently located within the working memory 1518, including an operating system 1514, device drivers, executable libraries, and/or other code, such as one or more application programs 1516, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1506 described above. In some cases, the storage medium might be incorporated within a computer system, such as computer system 1500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1500 and/or might take the form of source and/or installable code, which upon compilation and/or installation on the computer system 1500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 1500 may be omitted or may be implemented separate from the illustrated system. For example, the processor 1504 and/or other elements may be implemented separate from the input device 1508. In one embodiment, the processor is configured to receive images from one or more cameras that are separately implemented. In some embodiments, elements in addition to those illustrated in FIG. 13 may be included in the computer system 1500.

Some embodiments may employ a computer system (such as the computer system 1500) to perform methods in accordance with the disclosure. For example, some or all of the procedures of the described methods may be performed by the computer system 1500 in response to processor 1504 executing one or more sequences of one or more instructions (which might be incorporated into the operating system 1514 and/or other code, such as an application program 1516) contained in the working memory 1518. Such instructions may be read into the working memory 1518 from another computer-readable medium, such as one or more of the storage device(s) 1506. Merely by way of example, execution of the sequences of instructions contained in the working memory 1518 might cause the processor(s) 1504 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 1500, various computer-readable media might be involved in providing instructions/code to processor(s) 1504 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1506. Volatile media include, without limitation, dynamic memory, such as the working memory 1518. Transmission media include, without limitation, coaxial cables, copper wire and fiber optics, including the wires that comprise the bus 1502, as well as the various components of the communications subsystem 1512 (and/or the media by which the communications subsystem 1512 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1504 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1500. These signals, which might be in the form of electromagnetic signals, acoustic signals, optical signals and/or the like, are all examples of carrier waves on which instructions can be encoded, in accordance with various embodiments of the invention.

The communications subsystem 1512 (and/or components thereof) generally will receive the signals, and the bus 1502 then might carry the signals (and/or the data, instructions, etc. carried by the signals) to the working memory 1518, from which the processor(s) 1504 retrieves and executes the instructions. The instructions received by the working memory 1518 may optionally be stored on a non-transitory storage device 1506 either before or after execution by the processor(s) 1504.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Thus, in the description above, functions or methods that are described as being performed by the computer system may be performed by a processor for example, the processor 1504 configured to perform the functions or methods. Further, such functions or methods may be performed by a processor executing instructions stored on one or more computer readable media.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method, comprising:
   from an active light source capable of being handled by a user, emitting an electromagnetic wave signal in an initial direction toward a planar layer, wherein the active light source is at a distance above the planar layer;
   directing the electromagnetic wave signal in one or more lateral directions different from the initial direction, toward a plurality of detectors positioned at peripheral locations relative to the planar layer;
   receiving the directed electromagnetic wave signal at the plurality of detectors; and
   estimating a position of the active light source based on a plurality of intensity measurements of the directed electromagnetic wave signal received at each of the plurality of detectors.

2. The method of claim 1 wherein the electromagnetic wave signal is emitted from an active stylus device.

3. The method of claim 1 wherein the electromagnetic wave signal comprises infrared light.

4. The method of claim 1 wherein the plurality of detectors comprise a plurality of photodetectors.

5. The method of claim 1 wherein the estimating step comprises determining a position of the active light source relative to the planar layer, wherein the position is a function of the intensity measurements.

6. The method of claim 1 wherein the planar layer is one of a plurality of layers within a display device.

7. The method of claim 1 wherein the planar layer comprises a scatter plate operable to perform the directing step.

8. An apparatus, comprising:
   a planar layer operable to receive electromagnetic wave signal emitted, from an active light source capable of being handled by a user, at an initial direction and direct the electromagnetic wave signal in one or more lateral directions different from the initial direction, wherein the active light source is at a distance above the planar layer;

a plurality of detectors positioned at peripheral locations relative to the planar layer and operable to receive the directed electromagnetic wave signal; and a processor coupled to the plurality of detectors, wherein the processor is configured to estimate a position of the active light source based on a plurality of intensity measurements of the directed electromagnetic wave signal received at each of the plurality of detectors.

9. The apparatus of claim 8 wherein the electromagnetic wave signal is emitted from an active stylus device.

10. The apparatus of claim 8 wherein the electromagnetic wave signal comprises infrared light.

11. The apparatus of claim 8 wherein the plurality of detectors comprise a plurality of photodetectors.

12. The apparatus of claim 8 wherein the processor is further configured to determine a position of the active light source relative to the planar layer, wherein the position is a function of the intensity measurements.

13. The apparatus of claim 8 wherein the planar layer is one of a plurality of layers within a display device.

14. The apparatus of claim 8 wherein the planar layer comprises a scatter plate operable to perform the directing step.

15. An apparatus, comprising:
means for from an active light source capable of being handled by a user, emitting an electromagnetic wave signal in an initial direction toward a planar layer, wherein the active light source is at a distance about the planar layer;

means for directing the electromagnetic wave signal in one or more lateral directions different from the initial direction, toward a plurality of detectors positioned at peripheral locations relative to the planar layer;

means for receiving the directed electromagnetic wave signal at the plurality of detectors; and means for estimating a position of the active light source based on a plurality of intensity measurements of the directed electromagnetic wave signal received at each of the plurality of detectors.

16. The apparatus of claim 15 wherein the electromagnetic wave signal is emitted from an active stylus device.

17. The apparatus of claim 15 wherein the electromagnetic wave signal comprises infrared light.

18. The apparatus of claim 15 wherein the plurality of detectors comprise a plurality of photodetectors.

19. The apparatus of claim 15 wherein the estimating step comprises means for determining a position of the active light source relative to the planar layer, wherein the position is a function of the intensity measurements.

20. The apparatus of claim 15 wherein the planar layer is one of a plurality of layers within a display device.

21. The apparatus of claim 15 wherein the planar layer comprises a scatter plate operable to perform the directing step.

22. A processor-readable non-transitory medium comprising processor readable instructions configured to cause a processor to:
from an active light source capable of being handled by a user, emit an electromagnetic wave signal in an initial direction toward a planar layer, wherein the active light source is at a distance about the planar layer;

direct the electromagnetic wave signal in one or more lateral directions different from the initial direction, toward a plurality of detectors positioned at peripheral locations relative to the planar layer;

receive the directed electromagnetic wave signal at the plurality of detectors; and estimate a position of the active light source based on a plurality of intensity measurements of the directed electromagnetic wave signal received at each of the plurality of detectors.

23. The processor-readable non-transitory medium of claim 22 wherein the electromagnetic wave signal is emitted from an active stylus device.

24. The processor-readable non-transitory medium of claim 22 wherein the electromagnetic wave signal comprises infrared light.

25. The processor-readable non-transitory medium of claim 22 wherein the plurality of detectors comprise a plurality of photodetectors.

26. The processor-readable non-transitory medium of claim 22 wherein the estimating step comprises determining a position of the active light source relative to the planar layer, wherein the position is a function of the intensity measurements.

27. The processor-readable non-transitory medium of claim 22 wherein the planar layer is one of a plurality of layers within a display device.

28. The processor-readable non-transitory medium of claim 22 wherein the planar layer comprises a scatter plate operable to perform the directing step.

* * * * *